G., W., A., E., & F. HANLON.
Velocipede.
No. 79,654.
Patented July 7, 1868.
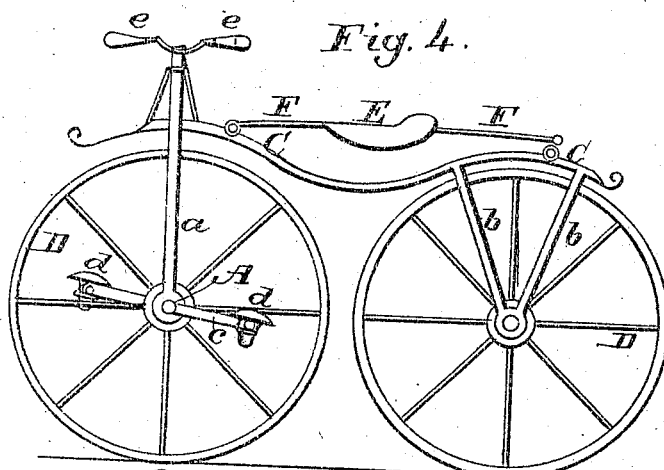
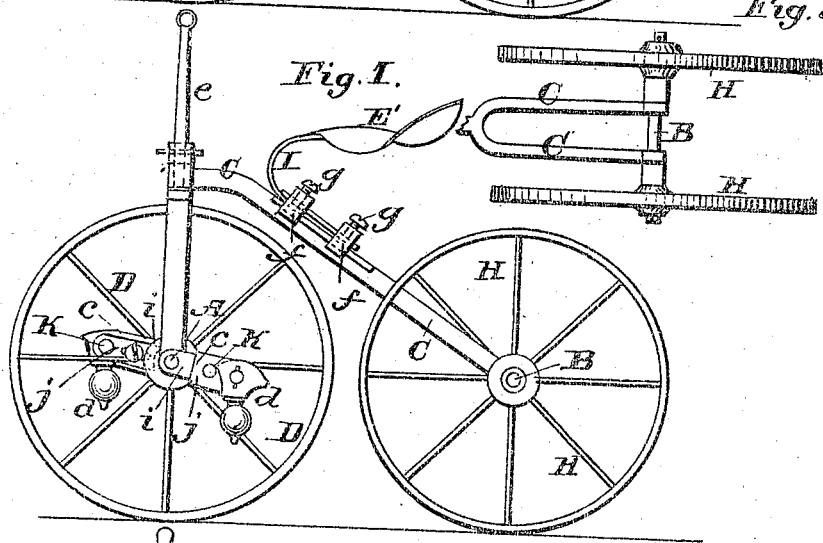
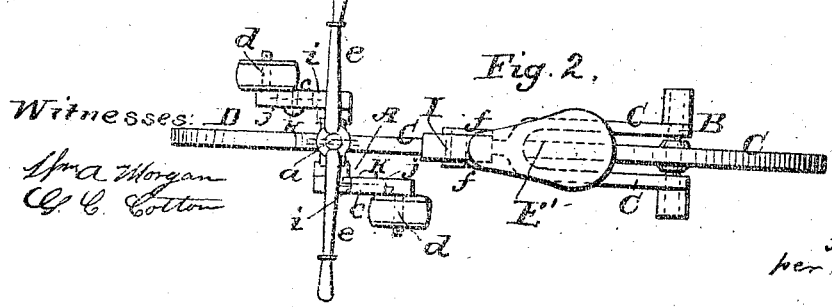

United States Patent Office.

GEORGE HANLON, WILLIAM HANLON, ALFRED HANLON, EDWARD HANLON, AND FREDERICK HANLON, OF NEW YORK, N. Y.

*Letters Patent No. 79,654, dated July 7, 1868.*

IMPROVEMENT IN VELOCIPEDES.

*The Schedule referred to in these Letters Patent and making part of the same.*

TO ALL WHOM IT MAY CONCERN:

Be it known that we, GEORGE HANLON, WILLIAM HANLON, ALFRED HANLON, EDWARD HANLON, and FREDERICK HANLON, of the city, county, and State of New York, have invented a new and improved Velocipede; and we do hereby declare that the following is a full, clear, and exact description thereof, which will enable others skilled in the art to make and use the same, reference being had to the accompanying drawing, forming a part of this specification.

Figure 1 represents a side elevation of our improved velocipede.

Figure 2 is a plan or top view of the same.

Figure 3 is a detail plan view of the same.

Figure 4 is a side elevation of the velocipede now in use, and which is improved by our invention.

Similar letters of reference indicate corresponding parts.

This invention relates to certain improvements on that kind of velocipedes which are generally used with two wheels only, which are driven by a person sitting on the perch, and working, with his feet, cranks on the axle of the front wheel.

The object of our invention is to so construct the velocipede that it can be used by various-sized persons, and that it may be balanced by the addition of a third wheel for persons learning to use it.

Our invention consists, first, in making the seat adjustable on the inclined perch, and in also making the foot-rests on the front axle lengthwise adjustable, so that the whole apparatus may be used by either large or small persons.

The invention also consists in so hanging the rear axle in the forked rear end of the perch that either one or two wheels may be hung on it. Persons learning to use the instrument should first use three wheels, the two on one axle being far enough apart to allow the instrument to stand firm. Experts, however, only use one wheel on each of the two axles.

To more fully understand our invention, it will be necessary to describe the apparatus now in use, and on which ours is an improvement. This apparatus is illustrated in fig. 4.

In the same are the two axles A B, which are hung in pendants $a$ $b$, projecting downward from a horizontal bar or frame C.

The pendant $a$ of the front axle is swivelled in the frame, to allow the steering of the apparatus. The rear pendant $b$ is rigidly secured to the axle. On each axle is hung or mounted one wheel, D.

E is the seat. The same is secured upon a spring-bar, F, which is, with its end, fixed in suitable manner to the connecting-bar C.

From the ends of the front axle A, project, in opposite directions, cranks $c$ $c$, to the ends of which foot-rests $d$ $d$, are swivelled.

The operator, sitting on the seat E, turns the axle A by means of his feet, and steers the apparatus, by turning the pendant, by means of the handles $e$.

It will be seen that such an apparatus, when once constructed, cannot be adjusted to persons of different size, and the machines have therefore to be made of various sizes to adapt them to the sizes of the owners. Furthermore, the apparatus is too heavy and clumsy to be of any practical value.

Our apparatus consists also of two axles, A B, hung in a perch or frame, C; that is, the front axle A is hung in a swivelled pendant, $a$, which has handles, $e$, for steering purposes, while the rear axle, B, is hung directly in the rear end of the perch or bar C.

The front end of the perch is raised, to let the front wheel D work under it, but its rear end is brought down to a level with the axle B, as shown. The perch is thus in an inclined position, as shown in fig. 1. The rear end of the perch is forked, to have double supports for the rear axle B, and to let the rear wheel G work in the fork, as shown in fig. 2.

For beginners, it will be well to take off the wheel G, and to put two wheels, H H, on the ends of the axle B, as in fig. 3. These wheels, as the student becomes more expert, can be brought nearer together gradually until they are so close together that he will not perceive much difference in using but one wheel.

The seat E is secured to one end of a flat or other spring, I, which is, by means of clamps $f$ and screws $g$, fastened to the inclined perch C. By loosening the screws $g$, the seat may be adjusted on the perch so as to be brought nearer to or further away from the front axle, to adapt the apparatus to persons of different sizes. The seat may be of suitable shape or construction, and may be fitted for ladies' use, if desired.

The device for fastening the spring to the perch may be as shown, or of other suitable construction.

The front axle has cranks $c$ $c$, to which foot-rests $d$ $d$ are pivoted.

Each of the cranks is composed of two pieces, one piece, $i$, being attached to the axle A, while the other piece, $j$, carries the foot-rest. The two pieces are connected by means of a screw, $k$, and one of them is slotted, as in fig. 3, to make the cranks lengthwise adjustable. In this manner the foot-rests can be brought nearer to or further away from the seat, and the extension-cranks therefor aid in making the apparatus adjustable, for different-sized persons. It is evident that either the adjustable seat or the extension-cranks may alone make the apparatus adjustable; still, both may be used together on one machine. The handles $e$ may, if desired, be also made extensible.

The wheels may have rubber rings around the tires, to make them noiseless, and to prevent them from slipping.

Having thus described our invention, what we claim as new, and desire to secure by Letters Patent, is—

1. The seat E, when secured upon the end of a spring, I, and when adjustable on the perch C, substantially as described for the purpose set forth.

2. The extension-crank C, on the front axle A, of the velocipede, when arranged as described, for the purpose of making the velocipede adjustable, as set forth.

3. Providing the perch or connecting-frame C with a forked rear end, for the purpose of allowing the use of the wheel G within, or of two wheels H H without, the fork, as specified.

4. A velocipede, consisting of the bifurcated perch C, carrying the axles A B, of the front wheel D, and rear wheel G, or wheels H, of the adjustable spring-seat E, and of the extension-cranks $c$, on the front axle, all made and operating substantially as herein shown and described.

GEO. HANLON,
WM. HANLON,
ALFRED HANLON,
EDWARD HANLON,
FRED'K HANLON.

Witnesses:
FRANK BLOCKLEY,
FRANK RIVERS,
H. N. DAVIS, Jr.